US012586307B2

(12) United States Patent
Guan

(10) Patent No.: US 12,586,307 B2
(45) Date of Patent: Mar. 24, 2026

(54) METHOD, APPARATUS, DEVICE AND STORAGE MEDIUM FOR INTERACTING WITH A VIRTUAL OBJECT

(71) Applicant: Beijing Zitiao Network Technology Co., Ltd., Beijing (CN)

(72) Inventor: Zhong Guan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 321 days.

(21) Appl. No.: 18/343,212

(22) Filed: Jun. 28, 2023

(65) Prior Publication Data

US 2024/0029349 A1 Jan. 25, 2024

(30) Foreign Application Priority Data

Jul. 25, 2022 (CN) .......................... 202210877690.3

(51) Int. Cl.
*G06F 3/04815* (2022.01)
*G06F 3/0486* (2013.01)
(Continued)

(52) U.S. Cl.
CPC .......... *G06T 17/00* (2013.01); *G06F 3/04815* (2013.01); *G06F 3/0486* (2013.01); *G06T 11/001* (2013.01); *G06T 11/203* (2013.01)

(58) Field of Classification Search
CPC ........ G06F 15/177; G07F 17/32; G07F 17/34; G07F 9/08
See application file for complete search history.

(56) References Cited

U.S. PATENT DOCUMENTS

2004/0067469 A1* 4/2004 Rogan ..................... A63F 13/52
434/107
2011/0165939 A1* 7/2011 Borst ..................... A63F 13/63
463/29
(Continued)

FOREIGN PATENT DOCUMENTS

CN          112073742 A     12/2020
CN          112188297 A      1/2021
(Continued)

OTHER PUBLICATIONS

China National Intellectual Property Administration, Notification to Grant Patent Right for Invention issued in CN Application No. CN202210877690.3, Jun. 13, 2024, 6 pages.
(Continued)

*Primary Examiner* — Rayeez R Chowdhury
(74) *Attorney, Agent, or Firm* — Alleman Hall LLP

(57) ABSTRACT

A method for interacting with a virtual object is provided. The method includes presenting an interactive interface associated with a virtual object, the interactive interface comprising a first region, the first region presenting at least one virtual element associated with the virtual object, the first region further presenting a target value corresponding to the at least one virtual element. The method includes, in response to a target virtual element of at least one virtual element being moved from the first region to a second region of the interactive interface, presenting, using a dynamic change of a probabilistic interactive element, an execution value associated with a target interactive action for the target virtual element, and controlling the execution of the target interactive action for the target virtual element.

20 Claims, 5 Drawing Sheets

200E ⌐

(51) Int. Cl.
G06T 11/00 (2006.01)
G06T 11/20 (2006.01)
G06T 17/00 (2006.01)

(56) References Cited

U.S. PATENT DOCUMENTS

| | | | | |
|---|---|---|---|---|
| 2012/0173995 A1* | 7/2012 | Alameh | ................ | G06F 3/0486 |
| | | | | 715/761 |
| 2015/0089419 A1* | 3/2015 | Hwang | ................ | G06F 3/0482 |
| | | | | 715/768 |
| 2017/0287287 A1* | 10/2017 | Froy | ................... | G07F 17/3251 |
| 2018/0018077 A1* | 1/2018 | Yamane | ................... | G09G 5/34 |

FOREIGN PATENT DOCUMENTS

| | | |
|---|---|---|
| CN | 112774194 A | 5/2021 |
| CN | 113262483 A | 8/2021 |
| CN | 113262484 A | 8/2021 |
| CN | 113332716 A | 9/2021 |
| CN | 113975807 A | 1/2022 |
| JP | 6612391 B1 | 11/2019 |

OTHER PUBLICATIONS

Lafirel, "Final Fantasy 9 Theft Problem (Transferred from Fantasy Network)," GameFV.com, Available Online at gamefv.com/final_fantasy/423.html, Feb. 7, 2008, 2 pages.

China National Intellectual Property Administration, Office Action and Search Report Issued in Application No. 202210877690.3, Mar. 12, 2024, 25 pages.

"What good things did everyone steal in the classic game "Xuanyuanjian 3"?," Baidu, Available Online at baijiahao. baidu.com/s?id=1641823203065290901&wfr=spider&for=pc, Aug. 14, 2019, 14 pages.

"[Cooked] 23 Ways to Steal Your Friends' Stuff in Minecraft!," bilibili, Available Online at www.bilibili.com/video/BV1Tq4y1F7WG/?vd_source=08c26a0045ad5b069c937f676b34d, Jan. 27, 2022, 2 pages.

FearlessTS, "Teaching of Stealing Businessmen's Methods and Stealing Skills in the Early Stage of Bode's Gate 3," Bahamut, Available Online at www.gamersky.com/handbook/202010/1327956.shtml, Oct. 12, 2020, 10 pages.

"(Baldur's Gate 3) 100% theft," bilibili.com, Available Online at www.bilibili.com/video/BV15V411y7zq/?spm_id_from=333.337.search-1, Oct. 25, 2020, 5 pages.

\* cited by examiner

100

110

120

INVENTORY

200A

300

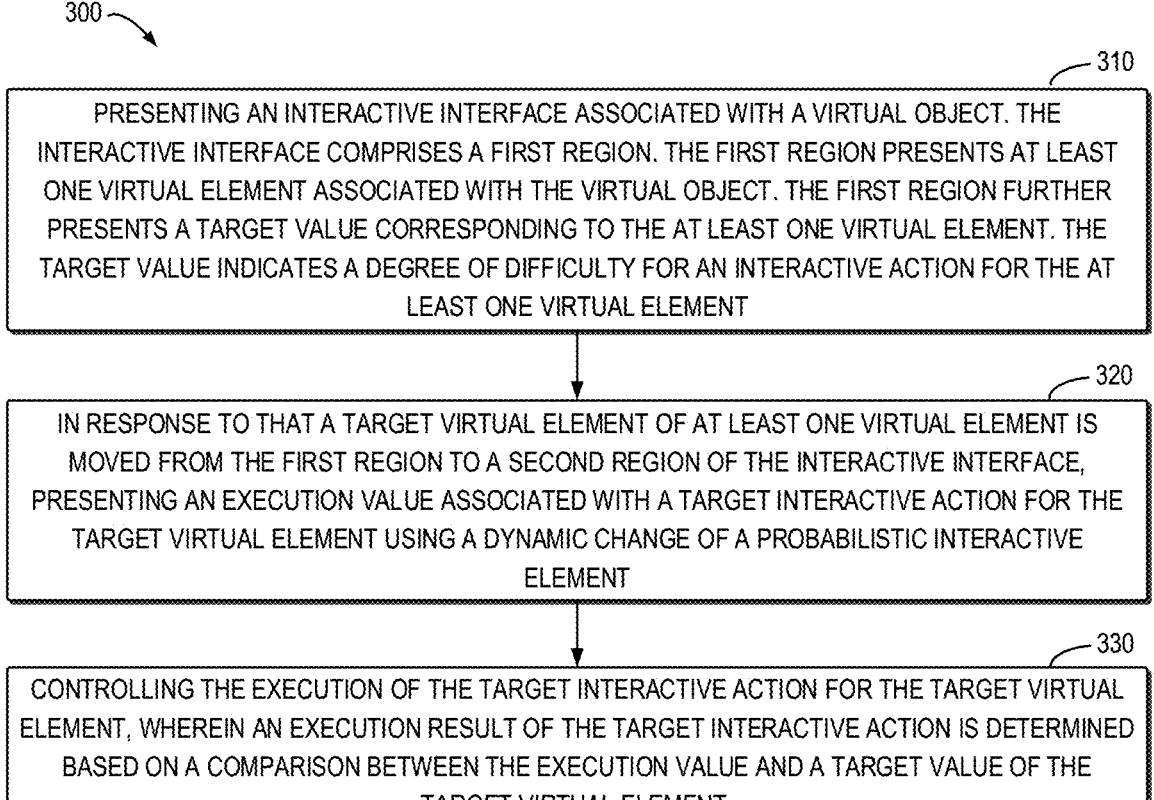

310

PRESENTING AN INTERACTIVE INTERFACE ASSOCIATED WITH A VIRTUAL OBJECT. THE INTERACTIVE INTERFACE COMPRISES A FIRST REGION. THE FIRST REGION PRESENTS AT LEAST ONE VIRTUAL ELEMENT ASSOCIATED WITH THE VIRTUAL OBJECT. THE FIRST REGION FURTHER PRESENTS A TARGET VALUE CORRESPONDING TO THE AT LEAST ONE VIRTUAL ELEMENT. THE TARGET VALUE INDICATES A DEGREE OF DIFFICULTY FOR AN INTERACTIVE ACTION FOR THE AT LEAST ONE VIRTUAL ELEMENT

320

IN RESPONSE TO THAT A TARGET VIRTUAL ELEMENT OF AT LEAST ONE VIRTUAL ELEMENT IS MOVED FROM THE FIRST REGION TO A SECOND REGION OF THE INTERACTIVE INTERFACE, PRESENTING AN EXECUTION VALUE ASSOCIATED WITH A TARGET INTERACTIVE ACTION FOR THE TARGET VIRTUAL ELEMENT USING A DYNAMIC CHANGE OF A PROBABILISTIC INTERACTIVE ELEMENT

330

CONTROLLING THE EXECUTION OF THE TARGET INTERACTIVE ACTION FOR THE TARGET VIRTUAL ELEMENT, WHEREIN AN EXECUTION RESULT OF THE TARGET INTERACTIVE ACTION IS DETERMINED BASED ON A COMPARISON BETWEEN THE EXECUTION VALUE AND A TARGET VALUE OF THE TARGET VIRTUAL ELEMENT.

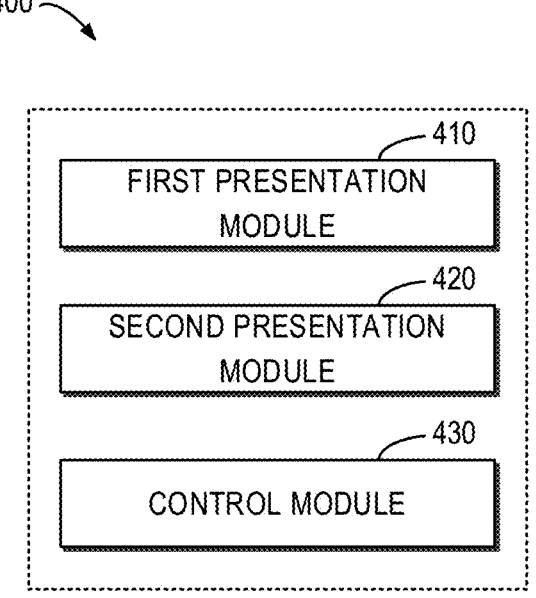

410

FIRST PRESENTATION MODULE

420

SECOND PRESENTATION MODULE

430

CONTROL MODULE

FIG. 4

METHOD, APPARATUS, DEVICE AND STORAGE MEDIUM FOR INTERACTING WITH A VIRTUAL OBJECT

CROSS REFERENCE TO RELATED APPLICATIONS

The present application claims priority to Chinese Patent Application No. 202210877690.3, entitled "Method, apparatus, device and storage medium for interacting with a virtual object" filed on Jul. 25, 2022, the contents of which are hereby incorporated by reference in its entirety.

TECHNICAL FIELD

The example embodiments of the present disclosure generally relate to the field of computers, in particular to a method, an apparatus, an electronic device, and a computer readable-storage medium for interacting with a virtual object.

BACKGROUND

With the development of computer technology, various forms of electronic devices can greatly enrich daily lives of people. For example, people may use an electronic device for various interactions in a virtual scene.

In some interactive scenarios, a user may interact with various types of virtual objects, such as avatars of other players or an intelligent object in a virtual scene, such as a non-player character (NPC). People expect to improve the level of friendliness in interacting with these virtual objects.

SUMMARY

In a first aspect of the present disclosure, a method of interacting with a virtual object is provided. The method comprises presenting an interactive interface associated with a virtual object, the interactive interface comprising a first region, the first region presenting at least one virtual element associated with the virtual object, the first region further presenting a target value corresponding to the at least one virtual element, the target value indicating a degree of difficulty for an interactive action for the at least one virtual element; in response to that a target virtual element of at least one virtual element is moved from the first region to a second region of the interactive interface, presenting, using a dynamic change of a probabilistic interactive element, an execution value associated with a target interactive action for the target virtual element; and controlling the execution of the target interactive action for the target virtual element, wherein an execution result of the target interactive action is determined based on a comparison between the execution value and a target value of the target virtual element.

In a second aspect of the present disclosure, an apparatus for interacting with a virtual object is provided. The apparatus comprises a first presentation module, configured to present an interactive interface associated with a virtual object, the interactive interface comprising a first region, the first region presenting at least one virtual element associated with the virtual object, the first region further presenting a target value corresponding to the at least one virtual element, the target value indicating a degree of difficulty for an interactive action for the at least one virtual element; a second presentation module, configured to in response to that a target virtual element of at least one virtual element is moved from the first region to a second region of the interactive interface, present, using a dynamic change of a probabilistic interactive element, an execution value associated with a target interactive action for the target virtual element; and a control module, configured to control the execution of the target interactive action for the target virtual element, wherein an execution result of the target interactive action is determined based on a comparison between the execution value and a target value of the target virtual element.

In a third aspect of the present disclosure, an electronic device is provided. The device comprises at least one processing unit; and at least one memory, the at least one memory is coupled to the at least one processing unit and stores instructions for execution by the at least one processing unit, which causes the device to implement the method of the first aspect.

In a fourth aspect of the present disclosure, a computer-readable storage medium is provided. The medium has a computer program stored thereon which, when executed by a processor, implements the method of the first aspect.

It should be understood that the content described in the summary section of the present invention is neither intended to limit key or essential features of the embodiments of the present disclosure, nor is it used to limit the scope of the present disclosure. Other features of the present disclosure will be easier to understand through the following description.

BRIEF DESCRIPTION OF DRAWINGS

The above and other features, advantages, and aspects of each embodiment of the present disclosure will become more apparent in combination with the accompanying drawings and with reference to the following detailed explanations. In the accompanying drawings, the same or similar reference numerals represent the same or similar elements.

FIG. 3 illustrates a flowchart of an example process of interacting with a virtual object according to some embodiments of the present disclosure;

FIG. 4 illustrates a block diagram of an apparatus for interacting with a virtual object according to some embodiments of the present disclosure.

DETAILED DESCRIPTIONS

Figure 1:
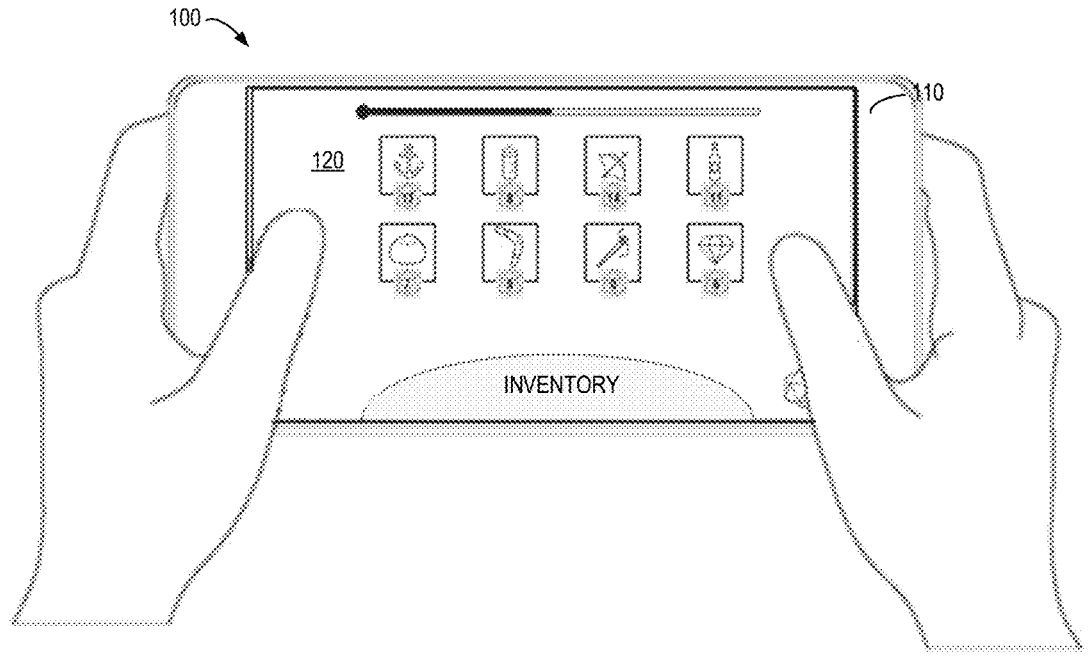
FIG. 1 illustrates a schematic diagram of an example environment in which the embodiments of the present disclosure can be implemented.

The embodiments of the present disclosure will be described in more detail below with reference to the accompanying drawings. Although some embodiments of the present disclosure are shown in the accompanying drawings, it should be understood that the present disclosure may be implemented in various forms and should not be interpreted as limited to the embodiments described herein. On the contrary, these embodiments are provided for a more thorough and complete understanding of the present disclosure. It should be understood that the accompanying drawings and embodiments of the present disclosure are only for illustrative purposes and are not intended to limit the scope of protection of the present disclosure.

In the description of the embodiments of the present disclosure, the term "including" and similar terms should be understood as open inclusion, that is, "including but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be included below.

As discussed above, in a virtual environment, a user may typically perform various types of interactions with various types of virtual objects in the virtual environment. Such virtual objects, for example, may include virtual characters corresponding to other users in the virtual environment, or an NPC. For example, the user may operate the virtual character that controlled by the user to engage in various types of interactions such as a conversation, an attack, and a transaction with other characters.

In the virtual environment, the user typically expect to simulate some real-world interactive behaviors. For example, a theft operation for a specific item of the virtual object may be simulated in some virtual environments. Such a theft operation is usually associated with a probability mechanism, however, traditional interaction processes typically only allow an operator to understand a result of a probability event, and the operator cannot understand the random mechanism involved in the interaction process, which will greatly affect interactive experience of the user.

The embodiments of the present disclosure propose a scheme for interacting with the virtual object. According to this scheme, an interactive interface associated with the virtual object (for example, an interface for stealing an item) may be presented accordingly according to a request of an interaction with the virtual object (for example, the NPC or the virtual characters of other users). Such an interactive interface may include a first region that presents at least one virtual element associated with the virtual object (for example, an item that the NPC or other virtual characters can steal). In addition, the first region further presents a target value corresponding to the at least one virtual element, where the target value indicates a degree of difficulty for an interactive action for the at least one virtual element.

In addition, in response to that a target virtual element of at least one virtual element is moved from the first region to a second region of the interactive interface, a dynamic change of a probabilistic interactive element may be used to present an execution value associated with a target interactive action for the target virtual element.

Furthermore, the execution of the target interactive action for the target virtual element is controlled, and an execution result of the target interactive action is determined based on a comparison between the execution value and a target value of the target virtual element. For example, when the execution value is greater than or equal to the target value, the target interactive action is caused to be successfully executed.

Therefore, on the one hand, the embodiments of the present disclosure can simulate an interaction process with finer granularity for a virtual element, improving the fun of the interaction; on the other hand, the embodiments of the present disclosure can also intuitively represent a probability mechanism of an interactive action through a dynamic probabilistic interactive element, thereby improving the friendliness of the interaction.

The following further describes the various example implementations of this scheme in combination with the accompanying drawings in detail. In order to illustrate the principles and ideas of the embodiments of the present disclosure, some descriptions below will refer to the field of gaming. However, it will be understood that this is only illustrative and is not intended to limit the scope of the present disclosure in any way. The embodiments of the present disclosure can be applied to various fields such as emulation, simulation, virtual reality, augmented reality, or the like.

Example Environment

Firstly, refer to FIG. 1, which schematically illustrates an example environment 100 in which the example embodiments according to the present disclosure can be implemented. As shown in FIG. 1, the example environment 100 may include an electronic device 110.

In some embodiments, as shown in FIG. 1, the electronic device 110 may, for example, include a portable device of an appropriate type, which may, for example, support a user to hold with both hands for various interactive operations. Such an electronic device 110 may include, for example, but are not limited to: a smart phone, a tablet computer, a personal digital assistant, a portable game terminal, or the like.

Such an electronic device 110 may include, for example, appropriate types of sensors for detecting hand gestures of a user. For example, the electronic device 110 may include a touch screen for detecting various types of hand gestures made by a user on the touch screen. Alternatively or additionally, the electronic device 110 may also include other appropriate types of sensing devices such as a proximity sensor or the like to detect various types of hand gestures made by a user within a predefined distance above the screen.

It should be understood that although the electronic device 110 is shown as a portable device in FIG. 1, this is only an example. In some other embodiments, the electronic device 110 may also be in other appropriate forms. For example, the electronic device 110 may include a display device for display and a computing device for computing, and the display device and the computing device, for example, may be physically coupled or separated.

For example, the electronic device 110 may include a display screen for image display, and a game console for screen rendering and game control.

In this scenario, the electronic device 110, for example, may utilize other appropriate input devices to achieve an interaction. For example, the electronic device 110 may achieve the interaction through an appropriate interactive device such as a keyboard, a mouse, a joystick, a game controller, or the like coupled though communication.

Continuing with reference to FIG. 1, as described in FIG. 1, the electronic device 110, for example, may present a graphical interface 120 which may present a corresponding virtual environment. For example, the graphical interface 120 may be a game application interface to present a corresponding game scene. Alternatively, the graphical interface 120 may also be another appropriate type of interactive interface that supports the user to control an execution of corresponding action by a virtual object in the virtual environment.

The following will provide a detailed introduction to the specific process of interacting with a virtual object in the virtual environment.

Example Interaction

In order to more intuitively represent the probability mechanism in the interaction process with the virtual object in the virtual environment, the embodiments of the present disclosure may enable users to understand the determination principle of whether a corresponding interactive action is successful by presenting a probabilistic interactive element.

Figure 2A:
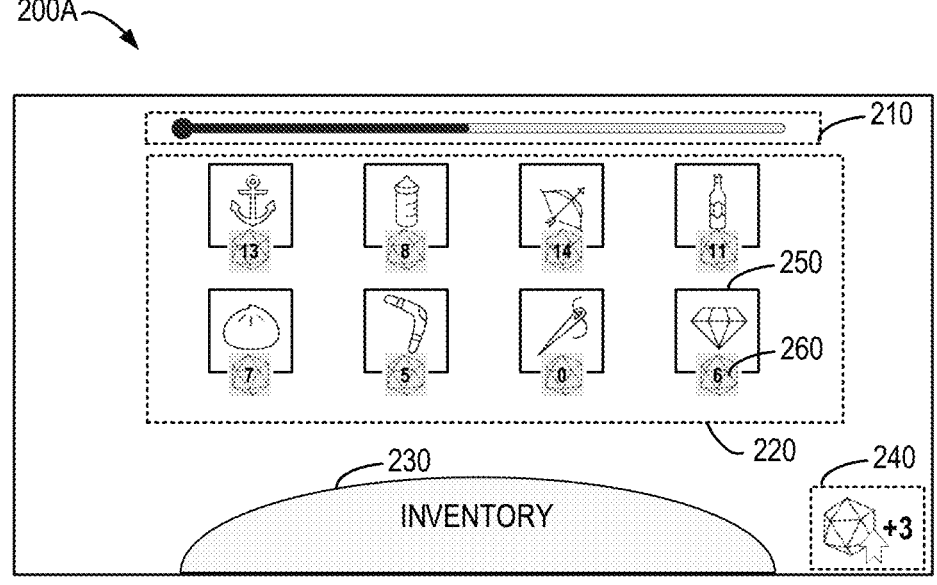
FIG. 2A, FIG. 2B, FIG. 2C, FIG. 2D, and FIG. 2E illustrate example interfaces according to some embodiments of the present disclosure.

FIG. 2A illustrates an interface 200A according to some embodiments of the present disclosure. In some embodiments, the electronic device 110 may present the interface 200A as shown in FIG. 2A upon receiving a request of an interaction for the virtual object. As introduced above, such an interface 200A may include, for example, a graphical interface associated with a virtual environment. Such a virtual environment, for example, may include, but is not limited to, any type of game environments, an emulation environment, or a simulation environment.

For example, the interface 200A may be a theft interactive interface for a specific virtual object (for example, a virtual character or an NPC of other players) in a virtual environment. For example, users may enter a theft mode with the virtual object through performing a specific operation or clicking a specific button on the interface in the virtual environment.

As shown in FIG. 2A, the interface 200A may include a plurality of display areas. For example, the interface 200A may include a first region 220 which may present at least one virtual element 250 associated with the virtual object.

In some embodiments, taking the theft interaction as an example, the virtual element 250, for example, may represent any kind of stealable item of the virtual object, such as a virtual prop.

Furthermore, the first region 220 also presents a target value 260 corresponding to the at least one virtual element 250. The target value 260 may indicate, for example, a degree of difficulty of an interactive action for the at least one virtual element.

In some embodiments, the target value 260 may be determined based on element information of the virtual element. For example, different types of virtual elements may correspond to different target values.

In addition or alternatively, the target value 260 may also be determined based on object information of the virtual object. For example, same items may have different degrees of difficulty under different virtual objects.

In addition or alternatively, the target value 260, for example, may also be determined based on event information of an interactive event with the virtual object. For example, the target value 260 may consider the correlation between an environmental factor in the virtual environment where the interactive event occurs. For example, the target value 260 may be related to one or more factors such as time, weather, visibility, noise level, and the like in the virtual environment when a theft event occurs. Alternatively, the target value 260 may be related to the positional relationship between the virtual character controlled by the user and the virtual object that is expected to be stolen.

As shown in FIG. 2A, the virtual element 250 may include, for example, a virtual item "diamond", and its corresponding target value 260 is "6". As shown in FIG. 2A, the first region 220 may present a plurality of different virtual elements, and their corresponding target values may be the same or different. Such values may indicate, for example, a difficulty difference of these corresponding virtual items being stolen in the theft mode.

For example, the target value "0" may indicate that the virtual item may always be successfully stolen. On the contrary, the target value "13" may indicate that the difficulty of stealing its corresponding virtual item is greater than the difficulty of stealing a virtual item corresponding to the target value "6".

In addition, the interface 200A may also include a second area 230, which may represent an inventory area of a character controlled by a user. For example, the user may need to move a specific virtual element from the first region 210 to a second region 230 to trigger an interactive action (for example, a theft action) for a specific virtual element.

As shown in FIG. 2A, the interface 200A also includes a third region 240, which may present a correction value to indicate the degree to which the degree of difficulty of the at least one virtual element 250 is adjusted.

For example, such a correction value may be associated with an attribute of a virtual character controlled by a user. For example, when a profession of the virtual character controlled by the user is a specific profession, the correction value may be a larger positive value. On the contrary, the correction value, for example, may be equal to zero or negative.

In addition, such a correction value, for example, may also be associated with an environmental factor in the virtual environment where the interactive event occurs. For example, the correction value may be related to one or more factors such as time, weather, visibility, noise level, and the like in the virtual environment when the theft event happens. Alternatively, the correction value may be related to the positional relationship between the virtual character controlled by the user and a virtual object that is expected to be stolen.

Taking FIG. 2A as an example, the correction value, for example, is "+3", which may indicate that the difficulty of stealing a virtual element is reduced by 3. In some embodiments, the correction value may be used to change the target value, for example, the correction value is subtracted from the target value during comparison. Alternatively, the correction value, for example, may also be used to control a generation of an execution value as described below.

In some embodiments, when the target value, for example, has already taken into account the event information of the interactive event, the correction value may not be presented.

Continuing with reference to FIG. 2A, the interface 200A, for example, may also present warning information 210, which may be used to indicate a degree of vigilance for a virtual object. In some embodiments, the degree of vigilance is used to indicate whether the interactive event is to be terminated.

Taking FIG. 2A as an example, the interface 200A may present the warning information 210 by using a line graphical element, where a color and/or a length of the line graphical element may be used to represent the degree of vigilance. For example, at the beginning of the theft event, the virtual object may have a default degree of vigilance which dynamically changes as the theft event progresses. When the degree of vigilance for the virtual object reaches a threshold, the theft event, for example, may be terminated, regardless of whether a default time length of the theft event is reached.

It should be understood that, in addition to reaching the threshold degree of vigilance, the termination of the theft event may be based on the default time of the theft event being arrival, whether the user voluntarily exits the theft event, or whether there is any virtual element that is able to be interacted with for the virtual user.

For example, after the default time of the theft event has arrived, the theft event may be automatically terminated. As another example, the user may also terminate the theft event at any time, regardless of whether the default time has arrived. As another example, after all virtual elements of the virtual object, for example, have been stolen, the theft event may be automatically terminated.

Figure 2B:
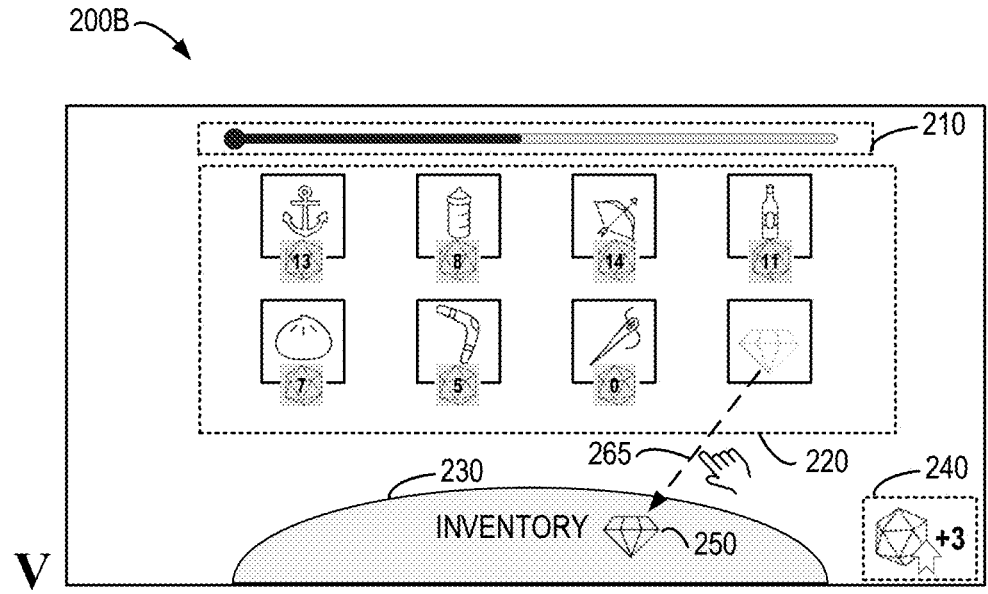

The electronic device 110 may also receive an interaction of a user in the interactive interface. Specifically, as shown in FIG. 2B, in an interface 200B, the electronic device 110 may receive an operation of the user such that the target virtual element (for example, the virtual element 250) is moved from the first region 220 to the second region 230.

In some embodiments, the electronic device 110, for example, may receive a drag operation 265 for the virtual element 250 to move it from the first region 220 to the second region 230. For example, the electronic device 110 may receive the drag operations 265 through an appropriate input device. For example, the electronic device 110 may receive a drag gesture on a touch screen from the user, or the electronic device 110 may also receive an action for dragging performed by the user through a mouse or other pointing device.

Figure 2C:
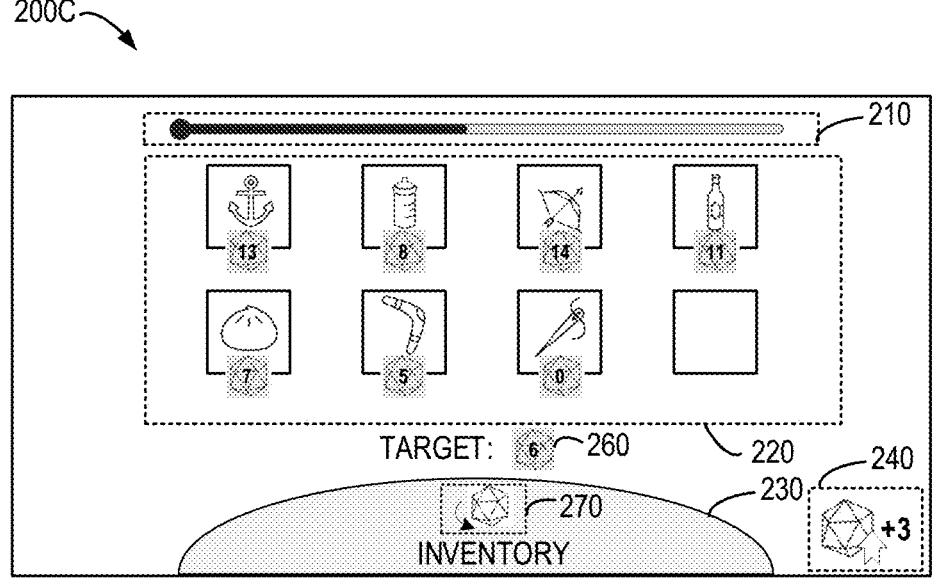

Furthermore, after the virtual element 250 is moved to the second region 230 (for example, in response to a completion of the drag gesture), the electronic device 110 may present an interface 200C as shown in FIG. 2C.

As shown in FIG. 2C, the electronic device 110 may independently present the target value 260 (for example, "6") of the target virtual element outside the first region 220 and the second region 230 to indicate that the target value 260 is to be used to determine whether the interactive action is successfully executed.

Additionally, the electronic device 110 may also present a dynamic change of a probabilistic interactive element 270 to represent a process of determining an execution value related to an interactive action. For example, the electronic device 110 may present a rotational animation of the probabilistic interactive element (for example, a virtual dice) in the second region 230 to indicate a process of determining the target value.

Figure 2D:
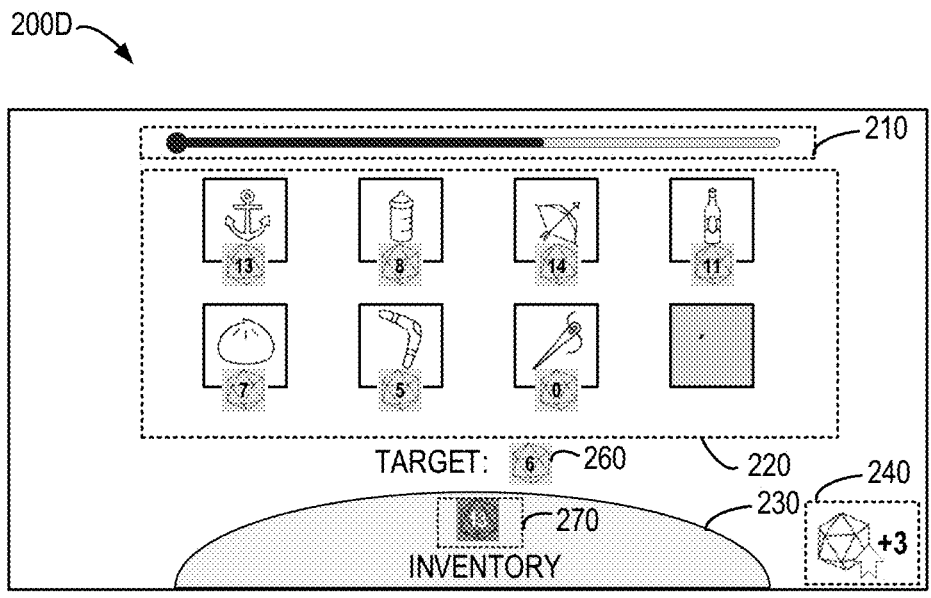

Furthermore, the electronic device 110 may control the execution of the interactive action based on a comparison of the execution value and the target value. In some embodiments, as shown in FIG. 2D, the electronic device 110 may utilize an animation change of the probabilistic interactive element 270 to present the execution value, such as "13", which may be randomly generated. Correspondingly, based on the execution value (for example, "13") being greater than the target value ("6"), the electronic device 110 may determine that the interactive action (for example, the theft action) for the virtual element 250 is successfully executed.

Correspondingly, the virtual element 250, for example, may be added to an inventory of the virtual character controlled by the user and may be displayed or not displayed in the second area 230. In addition, the electronic device 110 may stop presenting the virtual element 250 and the target value 260 corresponding to the virtual element 250 from the first region 220 to indicate a successful execution of the interactive action for the virtual element.

In addition or alternatively, the electronic device 110 may indicate the successful execution of the interactive actions for the virtual element 250 through a reminder of a text, a voice, or a video.

In addition, the electronic device 110 may also cause a change in a presentation of a position previously used to present the virtual element 250 in the first region 220, to indicate that the interactive action of the virtual element 250 is successfully executed (for example, successfully stolen).

In some embodiments, in response to the successful execution of the interactive action, the electronic device 110 may cause the degree of vigilance for the virtual object to be updated to improve the realism of the interaction. For example, the electronic device 110 cause the degree of vigilance for the virtual object to be increased by a first degree. As shown in FIG. 2D, the length of the line represented by the warning information 210, for example, may be correspondingly increased, to indicate an increase in the degree of vigilance for the virtual object after being stolen.

In some embodiments, an increased first degree of the degree of vigilance may be related to an attribute of the virtual object 220 which has an occurrence of an interaction. For example, after successfully stealing virtual objects which set to have different virtual values, the degree of vigilance may be caused to increase in different degrees.

Figure 2E:
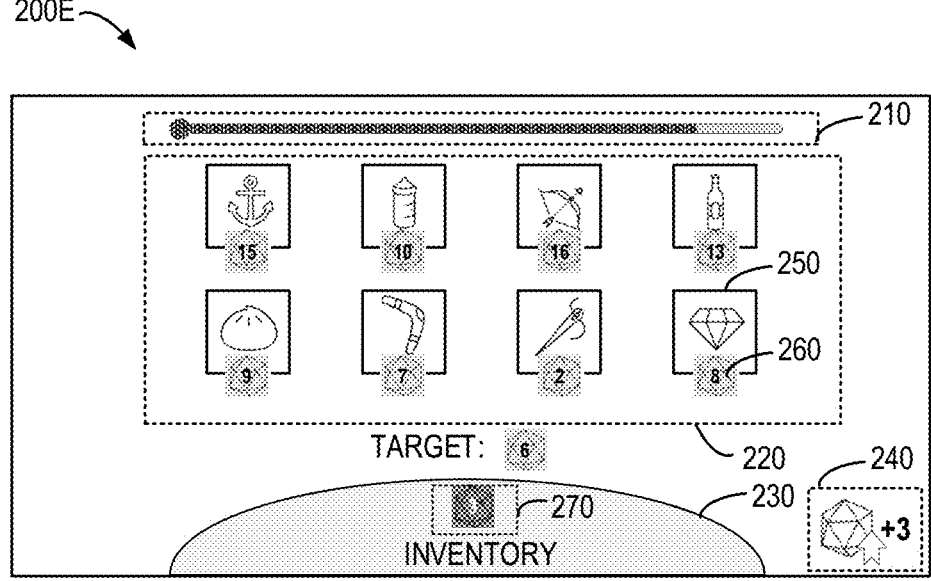

In some embodiments, the execution of the interactive action may also be failed. As shown in FIG. 2E, the electronic device 110 may utilize the animation change of the probabilistic interactive element 270 to present the execution value, for example, "3". Correspondingly, based on the execution value (for example, "3") being less than the target value ("6"), the electronic device 110 may determine that the execution of the interactive action (for example, a theft action) for the virtual element 250 has failed.

As shown in FIG. 2E, when it is determined that the execution value is less than the target value, the electronic device 110 may cause the virtual element 250 and the target value 260 corresponding to the virtual element 250 to be continuously presented in the first region 220 to indicate a failed execution of the interactive action for the virtual element 250.

Additionally or alternatively, the electronic device 110 may also indicate a failed execution of the interactive action for the virtual element 250 through a reminder of a text, a voice, or a video.

In some embodiments, in response to the failed execution of the interactive action, the electronic device 110 may also cause the degree of vigilance for the virtual objects to be updated, to improve the realism of the interaction. For example, the electronic device 110 cause the degree of vigilance for the virtual object to be increased by a second degree. As shown in FIG. 2E, the length of the line represented by the warning information 210, for example, may be correspondingly increased, to indicate an increase in the degree of vigilance for the virtual object after a failed theft.

In some embodiments, an increased second degree of the degree of vigilance may be related to an attribute of the virtual object 220 which has an occurrence of an interaction. For example, after virtual objects set to have different virtual values being stolen and failed, the degree of vigilance may be caused to increase in different degrees.

In some embodiments, compared to the increased first degree of the degree of vigilance triggered by a successful interactive action, the increased second degree of the degree of vigilance triggered by a failed interaction may be greater than the first level.

In some embodiments, a color of the line graphical element in the warning information 210 may change with length. For example, when the degree of vigilance is relatively low, the line graphical element may have a shorter length and appear as "green". As the degree of vigilance increases, the length of the line graphical element may increase, and its color may gradually change from "green" to "yellow" till "red" with the length changes.

In some embodiments, the degree of vigilance indicated by the warning information 210 may also vary with an increase of a time of duration of the interactive event. In some cases, the degree of vigilance may decrease with the increase of the time of duration of the interactive event. For example, in the absence of an interactive action for any virtual element (for example, a theft action), the degree of vigilance for the virtual object, for example, may decrease. Therefore, it may be simulated that the degree of vigilance for the virtual object may decrease correspondingly after a period of undetected theft action.

In some cases, the degree of vigilance may also increase with an increase of the time of duration of the interactive event. Therefore, the embodiments of the present disclosure may further simulate the tension of the theft scene and improve the authenticity of the interaction.

In some embodiments, the degree of vigilance for the virtual object, for example, may also affect the target value 260 of the virtual element 250. For example, the target value 260 of the virtual element 250 increases with the increase of the degree of vigilance. Taking FIG. 2E as an example, after a failed theft for the virtual element 250 occurs, target values of all virtual elements of the virtual object may be correspondingly increased to indicate that the difficulty of the interactive action for virtual elements is increased.

Based on the interactive process described above, on the one hand, the embodiments of the present disclosure can simulate an interaction process with finer granularity for a virtual element, improving the fun of the interaction; on the other hand, the embodiments of the present disclosure can also intuitively represent a probability mechanism of an interactive action through a dynamic probabilistic interactive element, thereby improving the friendliness of the interaction.

It should be understood that the specific number of elements and the specific numerical values in the specific interface described in the above examples are only illustrative and are not intended to constitute a limitation of the present disclosure.

Example Process

FIG. 3 illustrates a flowchart of a process 300 of interacting with a virtual object according to some embodiments of the present disclosure. For example, the process 300 may be independently implemented by the electronic device 110 in FIG. 1, or by a combination of the electronic device 110 and other computing devices. For the convenience of discussion, the process 300 will be described in combination with FIG. 1.

As shown in FIG. 3, at 310, the electronic device 110 presents an interactive interface associated with a virtual object. The interactive interface comprises a first region. The first region presents at least one virtual element associated with the virtual object. The first region further presents a target value corresponding to the at least one virtual element. The target value indicates a degree of difficulty for an interactive action for the at least one virtual element.

At 320, in response to that a target virtual element of at least one virtual element is moved from the first region to a second region of the interactive interface, the electronic device 110 presents an execution value associated with a target interactive action for the target virtual element using a dynamic change of a probabilistic interactive element.

At 330, the electronic device 110 controls the execution of the target interactive action for the target virtual element, wherein an execution result of the target interactive action is determined based on a comparison between the execution value and a target value of the target virtual element.

In some embodiments, controlling the execution of the target interactive action for the target virtual element comprises: in response to determining that the execution value is greater than or equal to the target value, the target virtual element and the target value corresponding to the target virtual element are caused to stop presenting from the first region, to indicate a successful execution of the target interactive action; or in response to determining that the execution value is less than the target value, the target virtual element and the target value corresponding to the target virtual element are caused to continuously present in the first region, to indicate a failed execution of the target interactive action.

In some embodiments, a present of the interactive interface is used to represent entering an interactive event with the virtual object, the electronic device may further: present warning information. The warning information indicates a degree of vigilance for the virtual object. The degree of vigilance indicates whether the interactive event is to be terminated.

In some embodiments, the electronic device 110 may further: cause the degree of vigilance to be increased by a first degree in response to a successful execution of the target interactive action; and cause the degree of vigilance to be increased by a second degree in response to a failed execution of the target interactive action. The second degree is greater than the first degree.

In some embodiments, a magnitude of the first degree and/or the second degree is related to an attribute of the target virtual element.

In some embodiments, the degree of vigilance varies with an increase of a time of duration of the interactive event.

In some embodiments, presenting warning information comprises: the warning information is presented using a line graphical element, wherein a color and/or a length of the line graphical element is used to represent the degree of vigilance.

In some embodiments, the target value of the at least one virtual element increases with the increase of the degree of vigilance.

In some embodiments, the electronic device 110 may further: receive an action for dragging the target virtual element from the first region to the second region; and in response to a completion of the action: determine that the target virtual element of the at least virtual element is moved from the first region to the second region of the interactive interface; and cause the target value of the target virtual element to be presented outside the first region and the second region.

In some embodiments, the at least one virtual element comprises at least a first element and a second element, and a first target value corresponding to the first element is different from a second target value corresponding to the second element.

In some embodiments, the target value is determined based on at least one of: element information of the at least one virtual element; object information of the virtual object; and event information of an interactive event with the virtual object.

In some embodiments, the interactive interface further comprises a third region. The third region presents a correction value indicating a degree to which the degree of difficulty of the at least one virtual element is adjusted.

Example Apparatus and Device

The embodiments of the present disclosure further provide corresponding apparatus for implementing the above methods or processes. FIG. 4 illustrates a schematic structural block diagram of an apparatus 400 that interacts with a virtual object according to some embodiments of the present disclosure.

As shown in FIG. 4, the apparatus 400 includes a first presentation module 410. The first presentation module 410 is configured to present an interactive interface associated with a virtual object. The interactive interface comprises a first region. The first region presents at least one virtual element associated with the virtual object. The first region further presents a target value corresponding to the at least one virtual element. the target value indicates a degree of difficulty for an interactive action for the at least one virtual element.

The apparatus 400 further includes a second presentation module 420. The second presentation module 420 is configured to present an execution value associated with a target interactive action for the target virtual element using a dynamic change of a probabilistic interactive element, in response to that a target virtual element of at least one virtual element is moved from the first region to a second region of the interactive interface.

In addition, the apparatus 400 further includes a control module 430. The control module 430 is configured to control the execution of the target interactive action for the target virtual element, wherein an execution result of the target interactive action is determined based on a comparison between the execution value and a target value of the target virtual element.

In some embodiments, the control module 430 is further configured to: in response to determining that the execution value is greater than or equal to the target value, cause the target virtual element and the target value corresponding to the target virtual element to stop presenting from the first region, to indicate a successful execution of the target interactive action; or in response to determining that the execution value is less than the target value, cause the target virtual element and the target value corresponding to the target virtual element to continuously present in the first region, to indicate a failed execution of the target interactive action.

In some embodiments, a present of the interactive interface is used to represent entering an interactive event with the virtual object, the apparatus 400 may further comprise a warning presentation module. The warning presentation module is configured to: present warning information. The warning information indicates a degree of vigilance for the virtual object. The degree of vigilance indicates whether the interactive event is to be terminated.

In some embodiments, the warning presentation module is further configured to: cause the degree of vigilance to be increased by a first degree in response to a successful execution of the target interactive action; and cause the degree of vigilance to be increased by a second degree in response to a failed execution of the target interactive action. The second degree is greater than the first degree.

In some embodiments, a magnitude of the first degree and/or the second degree is related to an attribute of the target virtual element.

In some embodiments, the degree of vigilance varies with an increase of a time of duration of the interactive event.

In some embodiments, the warning presentation module is further configured to: present the warning information using a line graphical element, wherein a color and/or a length of the line graphical element is used to represent the degree of vigilance.

In some embodiments, the target value of the at least one virtual element increases with the increase of the degree of vigilance.

In some embodiments, the apparatus 400 may further include an interaction module. The interaction module is configured to: receive an action for dragging the target virtual element from the first region to the second region; and in response to a completion of the action: determine that the target virtual element of the at least virtual element is moved from the first region to the second region of the interactive interface; and cause the target value of the target virtual element to be presented outside the first region and the second region.

In some embodiments, the at least one virtual element comprises at least a first element and a second element, and a first target value corresponding to the first element is different from a second target value corresponding to the second element.

In some embodiments, the target value is determined based on at least one of: element information of the at least one virtual element; object information of the virtual object; and event information of an interactive event with the virtual object.

In some embodiments, the interactive interface further comprises a third region. The third region presents a correction value indicating a degree to which the degree of difficulty of the at least one virtual element is adjusted.

The modules included in the apparatus 400 may be implemented in various ways, including software, hardware, firmware, or any combination thereof. In some embodiments, one or more modules may be implemented using software and/or firmware, such as machine executable instructions stored on a storage medium. In addition to machine executable instructions or as an alternative, some or all modules in the apparatus 400 may be implemented at least partially by one or more hardware logic components. As an example, rather than a limitation, the demonstrative types of hardware logic components that may be used include a field programmable gate array (FPGA), an application specific integrated circuit (ASIC), an application specific standard (ASSP), a system on chip (SOC), a complex programmable logic device (CPLD), and the like.

Figure 5:
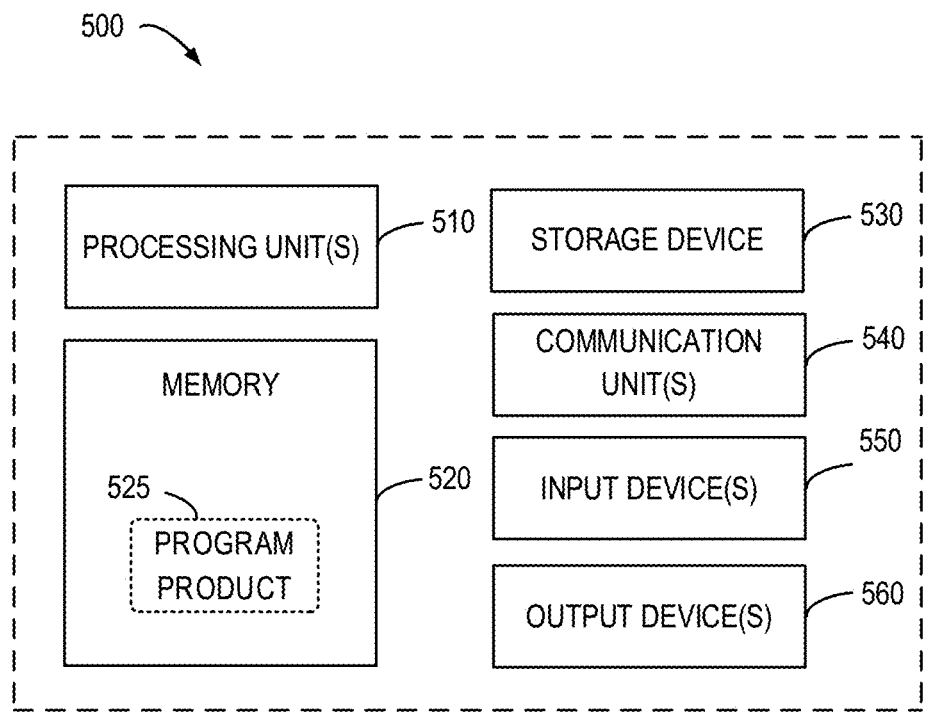
FIG. 5 illustrates a block diagram of a device capable of implementing multiple embodiments of the present disclosure.

FIG. 5 illustrates a block diagram of a computing device/system 500 in which one or more embodiments of the present disclosure may be implemented. It would be appreciated that the computing device/server 500 shown in FIG. 5 is only an example and should not constitute any restriction on the function and scope of the embodiments described herein.

As shown in FIG. 5, the computing device/system 500 is in the form of a general computing device. The components of the computing device/system 500 may include, but are not limited to, one or more processors or processing units 510, a memory 520, a storage device 530, one or more communication units 540, one or more input devices 550, and one or more output devices 560. The processing unit 510 may be an actual or virtual processor and can execute various processes according to the programs stored in the memory 520. In a multiprocessor system, multiple processing units execute computer executable instructions in parallel to improve the parallel processing capability of the computing device/system 500.

The computing device/system 500 typically includes a variety of computer storage medium. Such medium may be any available medium that is accessible to the computing device/system 500, including but not limited to volatile and non-volatile medium, removable and non-removable medium. The memory 520 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 530 may be any removable or non-removable medium, and may include a machine-readable medium, such as a flash drive, a disk, or any other medium, which can be used to store information and/or data (such as training data for training) and can be accessed within the computing device/system 500.

The computing device/system 500 may further include additional removable/non-removable, volatile/non-volatile storage medium. Although not shown in FIG. 5, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 520 may include a computer program product 525, which has one or more program modules configured to perform various methods or acts of various embodiments of the present disclosure.

The communication unit 540 communicates with a further computing device through the communication medium. In addition, functions of components in the computing device/system 500 may be implemented by a single computing cluster or multiple computing machines, which can communicate through a communication connection. Therefore, the computing device/system 500 may be operated in a networking environment using a logical connection with one or more other servers, a network personal computer (PC), or another network node.

The input device 550 may be one or more input devices, such as a mouse, a keyboard, a trackball, etc. The output device 560 may be one or more output devices, such as a display, a speaker, a printer, etc. The computing device/system 500 may also communicate with one or more external devices (not shown) through the communication unit 540 as required. The external device, such as a storage device, a display device, etc., communicate with one or more devices that enable users to interact with the computing device/system 500, or communicate with any device (for example, a network card, a modem, etc.) that makes the computing device/system 500 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions or the computer program is executed by the processor to implement the method described above.

Various aspects of the present disclosure are described herein with reference to the flow chart and/or the block diagram of the method, the apparatus (system) and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

The invention claimed is:

1. A method of interacting with a virtual object, comprising:

presenting an interactive interface associated with a virtual object, the interactive interface comprising a first region, the first region presenting at least one virtual element associated with the virtual object, the first region further presenting a target value corresponding to the at least one virtual element, the target value indicating a degree of difficulty for an interactive action for the at least one virtual element;

in response to that a target virtual element of at least one virtual element is moved from the first region to a second region of the interactive interface, presenting, using a dynamic change of a virtual dice, an execution value associated with a target interactive action for the target virtual element, wherein the execution value is randomly generated; and controlling the execution of the target interactive action for the target virtual element, wherein an execution result of the target interactive action is determined based on a comparison between the execution value and a target value of the target virtual element.

2. The method according to claim 1, wherein controlling the execution of the target interactive action for the target virtual element comprises:

in response to determining that the execution value is greater than or equal to the target value, causing the target virtual element and the target value corresponding to the target virtual element to stop presenting from the first region, to indicate a successful execution of the target interactive action; or in response to determining that the execution value is less than the target value, causing the target virtual element and the target value corresponding to the target virtual element to continuously present in the first region, to indicate a failed execution of the target interactive action.

3. The method according to claim 1, wherein a present of the interactive interface is used to represent entering an interactive event with the virtual object, the method further comprises:

presenting warning information, the warning information indicating a degree of vigilance for the virtual object, the degree of vigilance indicating whether the interactive event is to be terminated.

4. The method according to claim 3, further comprising:

in response to a successful execution of the target interactive action, causing the degree of vigilance to be increased by a first degree; and in response to a failed execution of the target interactive action, causing the degree of vigilance to be increased by a second degree, the second degree being greater than the first degree.

5. The method according to claim 4, wherein a magnitude of the first degree and/or the second degree is related to an attribute of the target virtual element.

6. The method according to claim 3, wherein the degree of vigilance varies with an increase of a time of duration of the interactive event.

7. The method according to claim 3, wherein presenting warning information comprises:

presenting the warning information using a line graphical element, wherein a color and/or a length of the line graphical element is used to represent the degree of vigilance.

8. The method according to claim 3, wherein the target value of the at least one virtual element increases with the increase of the degree of vigilance.

9. The method according to claim 1, further comprising:

receiving an action for dragging the target virtual element from the first region to the second region; and in response to a completion of the action:

determining that the target virtual element of the at least virtual element is moved from the first region to the second region of the interactive interface; and causing the target value of the target virtual element to be presented outside the first region and the second region.

10. The method according to claim 1, wherein the at least one virtual element comprises at least a first element and a second element, and a first target value corresponding to the first element is different from a second target value corresponding to the second element.

11. The method according to claim 1, wherein the target value is determined based on at least one of:

element information of the at least one virtual element;

object information of the virtual object; and event information of an interactive event with the virtual object.

12. The method according to claim 1, wherein the interactive interface further comprises a third region, the third region presenting a correction value indicating a degree to which the degree of difficulty of the at least one virtual element is adjusted.

13. An electronic device, comprising:

at least one processing unit; and at least one memory, the at least one memory is coupled to the at least one processing unit and stores instructions for execution by the at least one processing unit, which causes the device to implement a method of interacting with a virtual object when executed by the at least one processing unit, the method comprising:

presenting an interactive interface associated with a virtual object, the interactive interface comprising a first region, the first region presenting at least one virtual element associated with the virtual object, the first region further presenting a target value corresponding to the at least one virtual element, the target value indicating a degree of difficulty for an interactive action for the at least one virtual element;

in response to that a target virtual element of at least one virtual element is moved from the first region to a second region of the interactive interface, presenting, using a dynamic change of a virtual dice, an execution value associated with a target interactive action for the target virtual element, wherein the execution value is randomly generated; and controlling the execution of the target interactive action for the target virtual element, wherein an execution result of the target interactive action is determined based on a comparison between the execution value and a target value of the target virtual element.

14. The electronic device according to claim 13, wherein controlling the execution of the target interactive action for the target virtual element comprises:

in response to determining that the execution value is greater than or equal to the target value, causing the target virtual element and the target value corresponding to the target virtual element to stop presenting from the first region, to indicate a successful execution of the target interactive action; or in response to determining that the execution value is less than the target value, causing the target virtual element and the target value corresponding to the target virtual element to continuously present in the first region, to indicate a failed execution of the target interactive action.

15. The electronic device according to claim 13, wherein a present of the interactive interface is used to represent entering an interactive event with the virtual object, and wherein the method further comprises:

presenting warning information, the warning information indicating a degree of vigilance for the virtual object, the degree of vigilance indicating whether the interactive event is to be terminated.

16. The electronic device according to claim 15, wherein the method further comprises:

in response to a successful execution of the target interactive action, causing the degree of vigilance to be increased by a first degree; and in response to a failed execution of the target interactive action, causing the degree of vigilance to be increased by a second degree, the second degree being greater than the first degree.

17. The electronic device according to claim 16, wherein a magnitude of the first degree and/or the second degree is related to an attribute of the target virtual element.

18. The electronic device according to claim 15, wherein the degree of vigilance varies with an increase of a time of duration of the interactive event.

19. The electronic device according to claim 15, wherein presenting warning information comprises:

presenting the warning information using a line graphical element, wherein a color and/or a length of the line graphical element is used to represent the degree of vigilance.

20. A non-transitory computer-readable storage medium, storing a computer program thereon that, when executed by a processor to implement a method of interacting with a virtual object, the method comprising:

presenting an interactive interface associated with a virtual object, the interactive interface comprising a first region, the first region presenting at least one virtual element associated with the virtual object, the first region further presenting a target value corresponding to the at least one virtual element, the target value indicating a degree of difficulty for an interactive action for the at least one virtual element;

in response to that a target virtual element of at least one virtual element is moved from the first region to a second region of the interactive interface, presenting, using a dynamic change of a virtual dice, an execution value associated with a target interactive action for the target virtual element, wherein the execution value is randomly generated; and controlling the execution of the target interactive action for the target virtual element, wherein an execution result of the target interactive action is determined based on a comparison between the execution value and a target value of the target virtual element.

\* \* \* \* \*